Patented Apr. 27, 1954

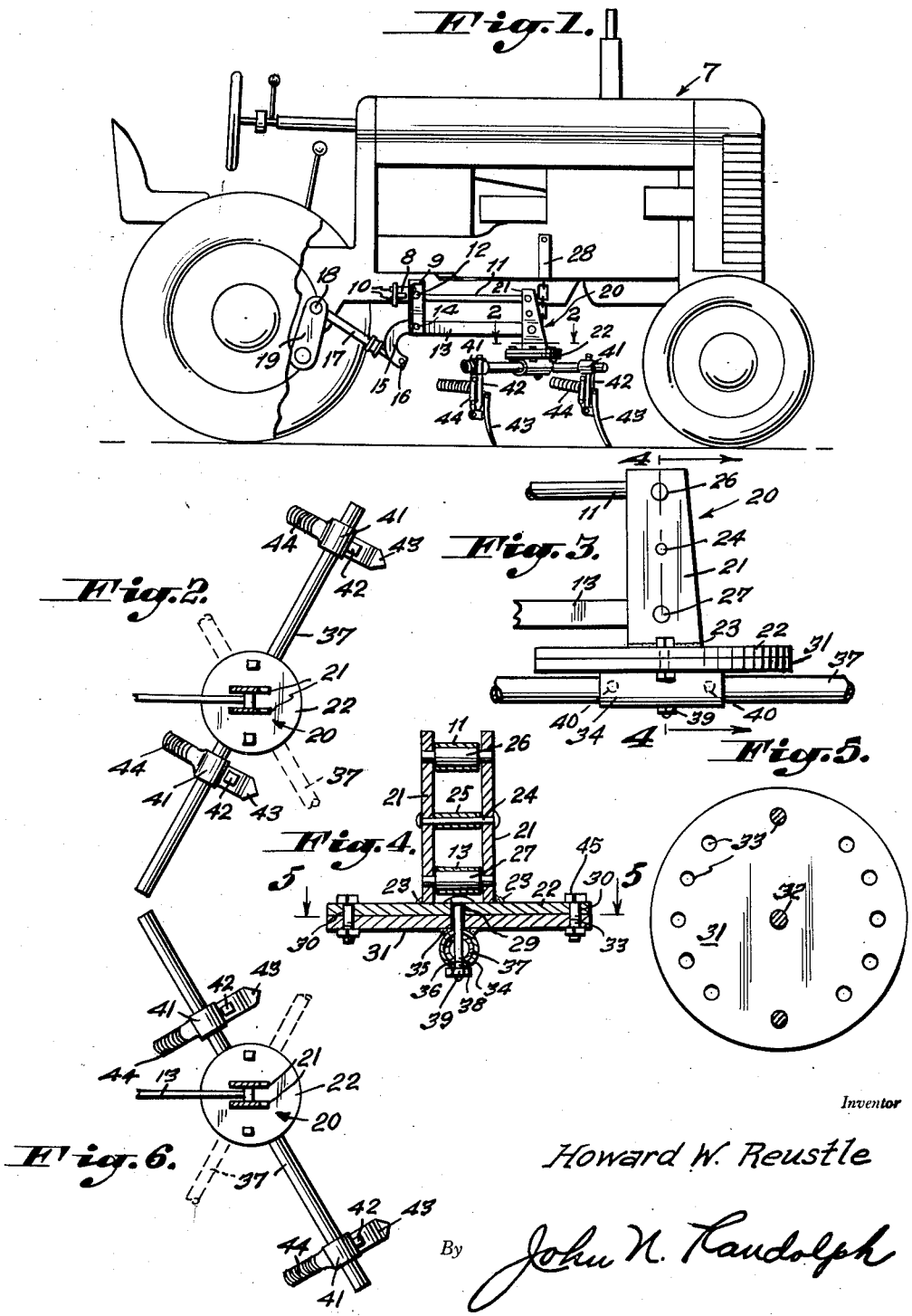

2,676,527

UNITED STATES PATENT OFFICE 2,676,527

CULTIVATOR ATTACHMENT FOR TRACTORS

Howard W. Reustle, Vineland, N. J.

Application August 30, 1950, Serial No. 182,250

1 Claim. (Cl. 97—198.1)

This invention relates to a novel cultivator attachment for tractors and more particularly to an attachment which is capable of being quickly and easily adjusted to cultivate crop rows of different widths or wherein the spacing between adjacent rows is wider or narrower than the conventional distance between such rows.

Another object of the invention is to provide a cultivator attachment wherein any desired number of cultivating shovels may be supported thereon for cultivating the earth between two adjacent rows of crops.

Various other objects and advantages of the invention will hereinafter become more fully apparent from the following description of the drawing, illustrating a presently preferred embodiment thereof, and wherein:

Figure 1 is a side elevational view, partly broken away, showing a conventional tractor with the attachment applied thereto;

Figure 2 is an enlarged horizontal sectional view of a portion of the attachment taken substantially along a plane as indicated by the line 2—2 of Figure 1;

Figure 3 is an enlarged fragmentary side elevational view of a part of the attachment;

Figure 4 is a vertical sectional view thereof taken substantially along a plane as indicated by the line 4—4 of Figure 3;

Figure 5 is a horizontal sectional view of a part of the attachment taken substantially along a plane as indicated by the line 5—5 of Figure 4, and Figure 6 is a view similar to Figure 2 but showing the parts differently positioned.

Referring more specifically to the drawing, the numeral 7 designates generally a conventional tractor having a laterally extending frame part 8 to which an upright supporting member 9 of angle iron is secured by suitable fastening means 10. The rear end of an upper rig link 11 is pivoted at 12 to the upper portion of the bracket 9 and a lower rig link 13 is pivotally connected at 14, near its rear end, to the lower end of the bracket 9. Said lower rig link 13 has a downwardly curved hook-shaped rear end 15, the lower, free end of which is pivotally connected at 16 to the forward end of a lift pipe or link 17, the rear end of which is connected at 18 to a manually or hydraulically actuated crank 19 which is adapted to be actuated for exerting a thrust or pull on the link 17 to swing the lower rig link 13 in either direction in a vertical plane on its pivot 14. The parts previously described are all of conventional construction.

The improvement in the cultivator attachment includes a modified rig coupling, designated generally 20, including two upright plates 21 which rise perpendicularly from a disk or plate 22 and are rigidly secured thereto as by welding, as indicated at 23. The upright plates 21 are connected at one or more points by a rivet 24 which extends therethrough and which carries a spacing sleeve 25 which is disposed between and the ends of which abut against the inner sides of the plates 21. A journal pin 26 extends between the plates 21, near their upper ends, and the forward end of the upper rig link 11 is pivotally connected to the rig coupling 20 by engagement with the pivot pin 26. The forward end of the lower rig link 13 turnably engages a pivot pin 27 which extends between and is connected to the plates 21, near their lower ends, for pivotally connecting said link 13 to the coupling rig 20 and below the link 11, so that when the forward end of the link 13 is swung vertically in either direction by movement of the actuating crank 19, as previously described, the forward end of the upper link 11 will move in unison therewith so that the rig coupling 20 will be displaced upwardly or downwardly while maintaining substantially a vertical position and with its disk 22 maintained in substantially a horizontal plane. The rig coupling may be provided with a conventional depth adjustment 28.

The disk 22 is provided with a central opening 29 and two diametrically aligned openings 30 which are disposed adjacent portions of the periphery of said disk.

The invention also includes a second disk 31 of the same diameter as the disk 22 which is provided with a central opening 32 and a plurality, preferably twelve (12) openings 33 which are disposed around the opening 32 and spaced therefrom a distance corresponding to the spacing between the opening 29 and openings 30. Each of the plurality of openings 33 is disposed in diametrical alignment with another opening 33 of said disk 31, so that the disk 31 may be turned to position different of the openings 33 in registration with the openings 30 of the disk 22. A sleeve 34 is disposed against the underside of the disk 31 and secured thereto as by welding, as seen at 35, said disk having aligned openings 36 intermediate of its ends which register with the central opening 32 of disk 31. The sleeve 34 is of a length substantially less than the diameter of the disk 31 so that the ends of said sleeve are spaced inwardly with respect to the openings 33.

A pipe or tube 37 extends slidably and turnably through the sleeve 34 and is provided with an opening 38 intermediate of its ends which is adapted to register with the openings 36 for receiving the shank of a headed bolt and nut fastening 39 which extends downwardly through the openings 29 and 32 and thence through the openings 36 and 38 for connecting the disks 22 and 31 together at their centers and for rigidly and detachably securing the pipe 37 in the sleeve 34. The pipe 37 may be provided with additional openings 40, spaced from its center opening 38, as indicated in dotted lines in Figure 3, which openings may be selectively aligned with the openings 36 to receive the shank of the fastening 39 so that one end of the pipe 37 will extend a greater distance away from the disks 22 and 31 than the other end of said pipe. One or more clamps 41 is adjustably mounted on each end of the pipe 37 so that said clamps 41 may be loosened for movement toward or away from the ends of the pipe 37. A shovel shank 42 is adjustably clamped in each clamp 41 and extends downwardly therefrom. Each shank 42 supports a conventional cultivator shovel 43 on its lower end and is equipped with a conventional trip spring unit 44.

The disk 31 can be turned on the shank of the fastening 39 as an axis so that any two diametrically aligned openings 33 thereof will register with the openings 30 of the disk 22 to receive the shanks of headed bolt and nut fastenings 45 by which the disks are detachably and adjustably connected to position the pipe 37 either transversely of the tractor 7 or at any angle relatively to the longitudinal axis of the tractor 7 or even parallel thereto, if desired, so that the pipe 37 may conveniently travel between crop rows of different widths. Likewise, either the inner or outer end of the pipe 37, considered relatively to the longitudinal center of the tractor 7, may be disposed in a forwardmost position for accomplishing the cultivating operation.

It will be readily apparent that another unit similar to the unit as seen in Figure 1 will be mounted on the opposite side of the tractor 7 so that the shovels of the two units may cultivate on opposite sides of a crop row and the pipes 37 of the two units could be mounted in the relationship of the pipes as illustrated in Figures 2 and 6, if said views are considered as a unit, the parts in one view constituting a part of one assembly and the parts of the other view constituting a part of the other assembly.

Various modifications and changes are contemplated and may obviously be resorted to, without departing from the spirit or scope of the invention as hereinafter defined by the appended claim.

I claim as my invention:

An adjustable cultivator attachment comprising a plate, the upper face of said plate having means for attaching same to a vehicle in a horizontal plane, a disk disposed beneath the plate, means swivelly connecting the disk to the plate, a sleeve secured to the underside of the disk and diametrically thereof, an elongated supporting member extending loosely through the sleeve having cultivator shovel supporting end portions each projecting beyond an end of the sleeve and outwardly from the periphery of the disk and swingable with the sleeve and disk relatively to the plate in a horizontal plane to position said end portions of the supporting member at various angles relatively to the direction of movement of the attachment and with either end portion in advance of the other; said supporting member having longitudinally spaced openings intermediate of its ends extending transversely therethrough; means detachably clamping the disk to the plate in various adjusted positions; and said swivel means including a bolt having a shank extending diametrically through the sleeve and selectively through one of the transverse openings for adjustably positioning the end portions of the supporting member relatively to the sleeve and disk and to positively anchor the supporting member nonrotatably in the sleeve.

References Cited in the file of this patent
UNITED STATES PATENTS

| Number | Name | Date |
|---|---|---|
| 576,748 | Tanner | Feb. 9, 1897 |
| 804,105 | Doolen | Nov. 7, 1905 |
| 1,760,940 | English | June 3, 1930 |
| 2,346,757 | Horner | Apr. 18, 1944 |
| 2,512,114 | Robinson et al. | June 20, 1950 |
| 2,533,542 | Walz et al. | Dec. 12, 1950 |